United States Patent [19]

Dominquez et al.

[11] 4,396,729

[45] Aug. 2, 1983

[54] REACTION INJECTION MOLDED ELASTOMER CONTAINING AN INTERNAL MOLD RELEASE MADE BY A TWO-STREAM SYSTEM

[75] Inventors: Richard J. G. Dominquez; Doris M. Rice; Rodney F. Lloyd, all of Austin, Tex.

[73] Assignee: Texaco Inc., White Plains, N.Y.

[21] Appl. No.: 371,161

[22] Filed: Apr. 23, 1982

[51] Int. Cl.$^3$ .............................................. C08G 18/14
[52] U.S. Cl. ..................................... 521/51; 521/110; 521/112; 521/159; 521/160; 521/163; 521/917
[58] Field of Search ................. 521/51, 110, 112, 159, 521/160, 163, 917

[56] References Cited

U.S. PATENT DOCUMENTS 3,428,610  2/1969  Klebert .
3,847,992  11/1974
4,296,212  10/1981  Ewen et al. .
4,374,210  2/1983  Ewen et al.
4,374,210  2/1983  Ewen et al. .

*Primary Examiner*—Maurice J. Welsh
*Attorney, Agent, or Firm*—Jack H. Park; Kenneth R. Priem; David L. Mossman

[57] ABSTRACT

The invention is a method of making a molded reaction injection molded elastomer which will release from its mold without the presence of externally applied mold release agents. The reaction injection molded (RIM) elastomer is made by injecting exactly two streams via a RIM machine into a mold cavity of the desired configuration, a formulation comprising in the first stream amine terminated polyethers of greater than 1,500 molecular weight, an amine terminated chain extender and an internal mold release agent, and in the second stream an aromatic polyisocyanate. The resulting RIM elastomer may be removed from the mold easily. RIM elastomers are useful, for example, for automobile body parts.

12 Claims, No Drawings

REACTION INJECTION MOLDED ELASTOMER CONTAINING AN INTERNAL MOLD RELEASE MADE BY A TWO-STREAM SYSTEM

This application is related to application Ser. No. 371,160, application Ser. No. 371,376, and application Ser. No. 371,377, all filed of even date.

BACKGROUND OF THE INVENTION

1. Field of the Invention

This invention concerns the field of reaction injection molded elastomers containing internal mold release agents.

2. Description of the Prior Art

Reaction injection molded elastomers such as polyurethanes are becoming quite popular as automobile body pats and other applications. These materials must be molded into the desired shape and demolded quickly to be economical. Heretofore, external mold release agents were applied to the inside of the mold before the injection of the reactive streams which would form the RIM part. A new product called Dow Corning ® Q2-7119 Fluid, which is a dimethyl siloxane with organic acid groups, has been developed for use in polyurethane RIM elastomers to avoid the necessity of an external application of mold release agent. However, since in polyurethane systems a tin catalyst is required for proper reactivity of the system and since the Dow Corning product mentioned above is reactive with and not compatible with tin catalysts or isocyanates, a third stream was necessary for the use of the internal mold release agent or the tin catalyst concentration was required to be adjusted. Product bulletins concerning the Dow Corning internal mold release agent advise that premixing the internal mold release agent with the polyol wouuld result in some gellation of the premix.

Most commercial RIM machines are of the two stream variety, thus limiting the application of the Dow Corning product.

We have discovered a method whereby the internal mold release agent described above may be used in a two stream system to make a RIM elastomer of superior properties.

SUMMARY OF THE INVENTION

The invention is a method of making a RIM elastomer which will release from its mold without the presence of an externally applied mold release agent comprising injecting exactly two streams via a RIM machine into a mold cavity of the desired configuration, a formulation comprising in the first stream primary or secondary amine terminated polyethers of greater than 1,500 molecular weight, an amine terminated chain extender and an internal mold release agent, and in the second stream an aromatic polyisocyanate. The invention is also the resulting RIM elastomer made from the method above.

DESCRIPTION OF THE PREFERRED EMBODIMENTS

The RIM elastomers of this invention may be prepared by reacting as few as three ingredients: a high molecular weight amine terminated polyether, an aromatic diamine chain extender and an aromatic polyisocyanate. An internal mold release agent is also required. The RIM elastomers of this invention do not require an added tin catalyst as it will interact with the mold release agent and harm the process and product.

The amine terminated polyethers useful in this invention include primary and secondary amine terminated polyether polyols of greater than 1,500 average molecular weight having from 2 to 6 functionality, preferably from 2 to 3, and an amine equivalent weight from about 750 to about 4,000. Mixtures of amine terminated polyethers may be used. In a preferred embodiment the amine terminated polyethers have an average molecular weight of at least 2,500.

The amine terminated polyether resins useful in this invention are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 percent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

The aromatic diamine chain extenders useful in this invention include, for example, 1-methyl-3,5-diethyl-2,4 diaminobenzene, 1-methyl-3,5 diethyl-2,6 diaminobenzene (both of these materials are also called diethyltoluene diamine or DETDA), 1,3,5-triethyl-2,6 diaminobenzene, 3,5,3',5'-tetraethyl-4,4'' diaminodiphenylmethane and the like. Particularly preferred aromatic diamine chain extenders are 1-methyl-3,5-diethyl-2,4 diaminobenzene or a mixture of this compound with 1-methyl-3,5-diethyl-2,6 diaminobenzene. It is within the scope of this invention to include some aliphatic chain extender materials as described in U.S. Pat. Nos. 4,246,363 and 4,269,945.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyantophenyl)methane, bis(3-methyl-4-isocyantophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued January 9, 1968 to Floyd E. Bentley.

By far the most preferred aromatic polyisocyanate is methylene bis(4-phenylisocyanate) or MDI. Pure MDI, quasi- prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

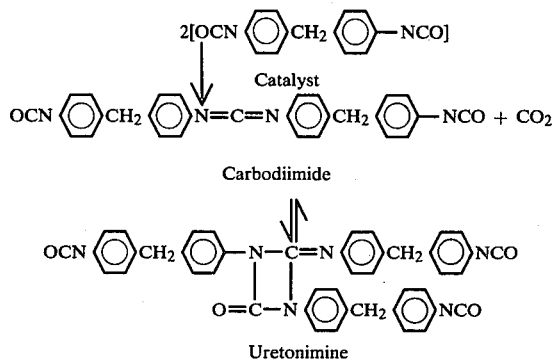

Examples of commercial materials of this type are Upjohn's ISONATE® 125M (pure MDI) and ISONATE 143L ("liquid" MDI). Preferably the amount of isocyanates used is the stoichiometric amount based on all the ingredients in the formulation or greater than the stoichiometric amount.

Of course, the term polyisocyanate also includes quasi-prepolymers of polyisocyanates with active hydrogen containing materials.

Additional catalysts are not desired in the practice of this invention. In a preferred embodiment of our invention no added catalysts are employed.

Other conventional formulation ingredients may be employed as needed such as; for example, foam stabilizers, also known as silicone oils or emulsifiers. The foam stabilizers may be an organic silane or siloxane. For example, compounds may be used having the formula:

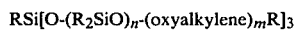

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Reinforcing materials, if desired, useful in the practice of our invention are known to those skilled in the art. For example, chopped or milled glass fibers, chopped or milled carbon fibers and/or other material fibers are useful.

Post curing of the elastomer of the invention is optional. Post curing will improve some properties such as heat sag. Employment of post curing depends on the desired properties of the end product.

The mold release agents useful for the method of this invention are internal mold release agents. The preferred mold release agent is Dow Corning Q2-7119. This mold release agent is a dimethyl siloxane with organic acid groups manufactured by Dow Corning Corporation.

The examples which follow exemplify this invention. However, these examples are not intended to limit the scope of the invention.

EXAMPLE 1

Seventy-five parts of an amine terminated polyether resin, JEFFAMINE® D-2000, 25 parts of another amine terminated polyether resin, JEFFAMINE T-3000, 18.9 parts of diethyltoluene diamine chain extender and two parts of Dow Corning internal mold release for RIM Q2-7119 were premixed and charged into the B-component working tank of an Accuratio VR-100 RIM machine. ISONATE® 143L (46.7 parts) was charged into the A-component working tank. The A-component temperature was adjusted to 80° F. and pressured to 1840 psi. The B-component temperature was adjusted to 120° F. and pressured to 2,000 psi. The mold temperature was adjusted to 155° F. The weight ratio A/B indicated by the preceding formulation was adjusted to 0.3866 to yield an elastomer with an isocyanate index of 1.05. The components were impingement mixed at the aforementioned pressured and caused to flow into the 18"×18"×⅛" mold. After one minute holding time the parts were removed from the mold. Green strength was excellent and the parts were considerably less difficult to remove from the mold than if the Dow Corning internal mold release was not present. Parts were poured on the day that the material was charged, the day after and four days after charging. No appreciable difference in "release ability" or properties (Table I) were observed. Thus, the reactivity of the system most probably remained constant.

TABLE I

Properties of Example 1 Elastomer As A Function Of The Time The Components Were In The Working Tanks; P/C 1 Hour at 250° F.

| Time | Same Day as Charged | Day After Charging | 4 Days After Charging |
|---|---|---|---|
| Tensile, psi | 3720 | 3600 | 3550 |
| Ult. Elongation, % | 280 | 270 | 260 |

TABLE I-continued

Properties of Example 1 Elastomer As A Function Of The Time The Components Were In The Working Tanks; P/C 1 Hour at 250° F.

| Time | Same Day as Charged | Day After Charging | 4 Days After Charging |
|---|---|---|---|
| Tear, pli | 360 | 380 | 380 |
| Flexural Modulus, psi Measured at | | | |
| Room temperature | 21,600 | 23,500 | 21,900 |
| 158° F. | 16,900 | 17,100 | 17,000 |
| −20° F. | 78,600 | 84,900 | 77,700 |
| Heat Sag, mm 1 hr at 250° F., 4" overhang | 3.4 | 3.8 | 4.0 |

EXAMPLE 2

A similar experiment to Example 1 was tried, the only difference being that the 25 parts of JEFFAMINE T-3000 polyether resin was substituted by a higher molecular weight aminated polyether resin (about 5,000 molecular weight) at the same level as in Example 1 (25 parts). This experiment was designed to extend the scope of this invention to higher molecular weight aminated polyether resins. Similar results on the "release ability" of this material were obtained as compared to Example 1. The release characteristics of an elastomer are rather qualitative and subjective, but it appeared that this elastomer (Example 2) was slightly better than the elastomer of Example 1, especially when the mold temperature was set at higher temperatures, about 170° F.

COMPARISON EXAMPLE 3

The same formulation of Example 1 was run except that the Dow Corning internal mold release for RIM Q-7119 was left out. Sticking to various applied surfaces on the mold and to bare metal was considerably worse than in Examples 1 and 2.

COMPARISON EXAMPLE 4

One hundred parts of MULTRANOL ® 3901, 18.9 parts of diethyltoluene diamine, 2 parts of Dow Corning Q-7119 and 0.5 parts of FOMREZ ® UL-28 tin catalyst were premixed and charged into the B-component working tank. This comparison example represents a conventional B-component with the internal mold release since a hydroxyl terminated polyether resin is used, therefore requiring the presence of a tin catalyst. ISONATE 143L was charged into the A-component working tank. When molded on the same day as charged, this elastomer exhibited porosity which did not improve even with higher mold temperature (∼170° F.). This porosity is best characterized as consisting of small liquid filled craters on the molded surface. The next day the problem got worse. This problem has been reported by the supplier of the Q-7119 RIM internal mold release and was attributed to interference of the Q-7119 with the tin catalyst. Because of this problem the part was unacceptable.

EXAMPLE 5

Accuratio Machine

| Accuratio Machine Formulation (Streams A and B) |
|---|
| B   65 parts aminated 5,000 molecular weight polyoxypropylene triamine (no ethylene oxide)<br>18.9 parts of DETDA |
| A   44.4 parts of experimental isocyanate comprising (∼98%) 4,4' MDI THANOL ® SF-5505 polyol quasi prepolymer - 22% by weight polyol<br>Equivalent weight = 167 |

The parts had excellent properties, especially heat sag. They released from the mold well without mold release agents. On addition of internal mold release Q2-7119 at 0.25% by weight and 1.0% by weight of the total formulation, the plaques released much easier than without the Q2-7119 internal release agent. There was no need to wax the mold with external mold release agent. This example shows the use of this invention with an MDI/high molecular weight quasi-prepolymer and higher molecular weight amine terminated polyether resins.

EXAMPLE 6

Accuratio Machine

| Accuratio Machine Formulation (Streams A and B) |
|---|
| B   71 parts aminated 5,000 molecular weight triamine (no ethylene oxide)<br>18.9 parts of DETDA |
| A   $\dfrac{\text{L-55-0}}{\text{ISONATE 143L}}\ \dfrac{1}{1.29}$  49.6 parts |

The formulation processed well and had excellent properties and had heat sag better than conventional system but not as good as Example 5. This example shows the use of this invention with an ISONATE 143L/high molecular weight quasi-prepolymer of the same composition (22% polyol) as in Example 5. On addition of internal mold release Q2-7119 at 0.25% by weight and 1.0% by weight of the formulation, the parts release much better than without the internal mold release. There was no need to wax the mold since the materials released well.

EXAMPLE 7

Accuratio Machine

The same formulation of Example 6 was evaluated except that an aminated 5,000 molecular weight triamine with 5 wt.% internal mixed ethylene oxide was used. Although this material could be processed without internal mold release and with internal mold release at 1.0 by weight of the total formulation (Dow Corning Q2-7119), the release characteristics were acceptable but not as good as for Examples 5 and 6.

EXAMPLE 8

Accuratio Machine

| Accuratio Machine Formulation (Streams A and B) | |
|---|---|
| B | 62.33 parts aminated 5,000 molecular weight triamine (no ethylene oxide) 18.9 parts of DETDA |
| A | $\frac{\text{Quasi-Prepolymer L-55-0}}{\text{ISONATE 143L}} = \frac{2}{1}$ 58.1 parts |

This example shows the use of this invention with a quasi-prepolymer with relatively high (33 wt.%) polyol content. This material processed very well and has excellent properties. It releases even without internal mold release; however, only from flat surfaces. With Dow Corning Q2-7119 internal mold release at 0.25 wt.% and 1.0 wt.% of the total formulation, the parts literally fell out of the mold. The release characteristics of this material with Q2-7119 are superior to the release characteristics of conventional systems employing wax external mold release agents.

EXAMPLE 9

Accuratio Machine

| Accuratio Machine Formulation (Streams A and B) | |
|---|---|
| B | 42.6 parts aminated 5,000 molecular weight triamine (no ethylene oxide) 18.9 parts of DETDA |
| A | L-55-0 73.7 |

This example shows the use of this invention with extremely high (50 wt.%) polyol containing quasi-prepolymers. The release characteristics of this formulation were acceptable but inferior to those of Examples 5, 6 and 8.

EXAMPLE 10

Accuratio Machine

The same formulation of Example 8 was run except that the L-55-0 quasi-prepolymer was replaced with L-6505-0 quasi-prepolymer. This example shows the use of this invention with quasi-prepolymers made from different polyols. The formulation was tried with Q2-7119 internal mold release at 0.25 wt.% and 1.0 wt.% of the total formulation. The parts with internal mold release had excellent release properties.

EXAMPLE 11

Accuratio Machine

| Accuratio Machine Formulation (Streams A and B) | |
|---|---|
| B | 80 parts aminated 5,000 molecular weight triamine (no ethylene oxide) 17.7 parts of DETDA |
| A | MONDUR ® PF 47.5 parts |

This material shows the utility of this invention with quasi-prepolymers which use low molecular weight polyols; e.g., dipropylene and tripropylene glycol. The green strength of the material was poor. However, when Q2-7119 internal mold release was added at 0.25 wt.% and 1.0 wt.% of the total formulation, the parts demolded easily.

EXAMPLE 12

Accuratio Machine

| Accuratio Machine Formulation (Streams A and B) | |
|---|---|
| B | 80 parts aminated 5,000 molecular weight triamine (no ethylene oxide) 18.9 parts DETDA |
| A | ISONATE 143L 36.8 parts |

This example shows the application of this invention to one-shot formulations using ISONATE 143L. With internal mold release Q2-7119 (Dow Corning) at 0.25 wt.% and 1.0 wt.% of the total formulation, the material had excellent release properties. The green strength of the material, however, was less than desirable.

EXAMPLE 13

Accuratio Machine

The same formulation as in Example 12 was evaluated except that an aminated 5,000 molecular weight triamine with 5 wt.% internal mixed ethylene oxide was used. The material was tough on demold; however, it did not release as well as Example 12.

GLOSSARY OF TERMS AND MATERIALS

| | |
|---|---|
| JEFFAMINE ® D-2000 | A polyoxypropylene diamine of about 2,000 molecular weight. |
| JEFFAMINE T-3000 | A polyoxypropylene triamine of about 3,000 molecular weight. |
| ISONATE ® 143L | Carbodiimide modified liquid MDI, a product of the Upjohn Co. |
| MULTRANOL ® 3901 | A conventional polyol of about 6,500 molecular weight prepared from propylene oxide and ethylene oxide containing mostly primary hydroxyl groups. A product of Mobay Chemical Co. |
| FOMREZ ® UL-28 | A tin catalyst which is similar in structure to dibutyltin dilaurate, a product of Witco Corp. |
| MONDUR ® PF | MDI quasi-prepolymer of about 180 E.W., a product of Mobay Chemical Co. |
| Quasi-Prepolymer L-55-0 | A quasi-prepolymer formed by reacting equal weight of ISONATE 143L and THANOL SF-5505 |

We claim:

1. A method for making a reaction injection molded elastomer which will release from its mold without the presence of an externally applied mold release agent comprising injecting exactly two strams via a RIM machine into a mold cavity of the desired configuration, a formulation comprising in the first stream primary or secondary amine terminated polyethers of greater than about 1,500 molecular weight having greater than 50% of their active hydrogens in the form of amine hydrogens, an amine terminated chain extender and an internal mold release agent, and in the second stream an aromatic polyisocyanate.

2. A method as in claim 1 wherein the amine terminated polyether has a functionality of about 2 to 6.

3. A method as in claim 2 wherein the functionality of the amine terminated polyethers is from about 2 to 3.

4. A method as in claim 1 wherein the amine terminated polyether has a molecular weight greater than about 2,500.

5. A method as in claim 1 where the internal mold release agent comprises a dimethyl siloxane with organic acid groups.

6. A RIM elastomer which will release from its mold without the presence of an externally applied mold release agent made by injecting exactly two streams via a RIM machine into a mold cavity of the desired configuration, a formulation comprising in the first stream primary or secondary terminated polyethers of greater than about 1,500 molecular weight having greater than 50% of their active hydrogens in the form of amine hydrogens, an amine terminated chain extender and an internal mold release agent, and in the second stream an aromatic polyisocyanate.

7. A method as in claim 6 wherein the amine terminated polyether has a functionality of about 2 to 6.

8. A method as in claim 7 wherein the amine terminated polyether has a functionality of about 2 to 3.

9. A method as in claim 6 wherein the amine terminated polyether has a molecular weight greater than about 2,500.

10. A method as in claim 6 wherein the internal mold release agent comprises a dimethyl siloxane with organic acid groups.

11. A method for making a RIM elastomer which will release from its mold without the presence of an externally applied mold release agent comprising injecting exactly two streams via a RIM machine into a mold cavity of the desired configuration, a formulation comprising in the first stream primary or secondary amine terminated polyethers of about 5,000 molecular weight having greater than 50% of their active hydrogens in the form of amine hydrogens an amine terminated chain extender and an internal mold release agent, and in the second stream an aromatic polyisocyanate.

12. A RIM elastomer which will release from its mold without the presence of an externally applied mold release agent made by injecting exactly two streams via a RIM machine into a mold cavity of the desired configuration, a formulation comprising in the first stream primary or secondary amine terminated polyethers of about 5,000 molecular weight having greater than 50% of their active hydrogens in the form of amine hydrogens, an amine terminated chain extender and an internal mold release agent, and in the second stream an aromatic polyisocyanate.

* * * * *